3,184,421
POLYMERIC COMPOSITION PREPARED FROM CELLULOSE SULFATE AND ALKYL ACRYLATE AND TEXTILE MATERIAL COATED THEREWITH
John R. Caldwell and Edward H. Hill, Kingsport, Tenn., assignors to Eastman Kodak Company, Rochester, N.Y., a corporation of New Jersey
No Drawing. Filed May 24, 1961, Ser. No. 112,184
9 Claims. (Cl. 260—15)

This invention concerns the preparation of polymeric compositions comprising polyacrylates polymerized in the presence of cellulose sulfates or a mixed ester of cellulose sulfate-acetate, sulfate-propionate, or sulfate-butyrate.

Various polymerization compositions have been prepared from acrylic acid and acrylic acid esters along with other polymerizable materials and the like such as those disclosed in U.S. 2,140,048 to Fikentscher et al. However, when many of these polymerizable compositions have been used as sheets, films, or as coatings on textile fibers the resultant material has been vapor tight as well as waterproof, and there has been a need for textile coatings for rainwear which would provide a waterproof coating, which would enable water vapor to pass through the fabric. At the same time it is desirable that the textile coating be resistant to solvents ordinarily used in drycleaning as well as resistant to soaps and detergents, so that the rainwear would not require a subsequent recoating after each drycleaning.

One object of this invention is to provide a method of preparing intimate mixtures of polyacrylate with cellulose sulfate or mixed esters of cellulose sulfates. Another object of the invention is to provide films, fibers, rods sheets, etc., made from compositions of polyacrylates in combination with cellulose sulfate. A further object of the invention is to furnish transparent, flexible sheets and films that have a high capacity to transmit water vapor and are valuable as leather substitutes. Still another object of the invention is to provide a coated or impregnated textile fabric or leather that has a high transmission rate for water vapor and will not allow the penetration of liquid water. Another object of the invention is to furnish a transparent, flexible coating for paper from a viscous water emulsion.

The objects of this invention are accomplished by polymerizing acrylic acid esters in the presence of cellulose sulfate or its mixed esters in water dispersion. The aqueous emulsions or dopes so obtained can be coated or cast to give films. These films are permeable to water vapor but are impermeable to liquid water.

An important feature of these products produced according to this invention is their ability to retain a high degree of flexibility under all conditions of use and, at the same time, retain the same property of transmitting water vapor, which is a difficult combination of characteristics to obtain in a single material. For example, it is known that films of polyvinyl alcohol can be plasticized to give flexibility and cross-linked to give water insolubility. Such films transmit water vapor. However, when they come in contact with liquid water or aqueous solutions, the plasticizer is leached from the film and a brittle, inflexible product is obtained when the film is dried. In contrast to this, the present invention provides a film containing cellulose sulfate that remains flexible even after prolonged contact with hot water. The polyacrylate resin functions as a permanent water-soluble plasticizer under all conditions of ordinary use.

The compositions which are operative in our invention contain from 20–75% cellulose sulfate or mixed esters of cellulose sulfate, while the preferred range is 30–60%.

The polymerization is carried out in aqueous dispersion. The cellulose ester is dissolved in water to give a solution of from 5–30% concentration and the acrylate monomer is added. Emulsifying agents such as sodium salts of sulfated alcohols, soaps, aromatic sulfonates, etc., can be used but are not necessary. The more reactive acrylate monomers should be added in several portions in order to obtain a smooth viscous emulsion. In order to obtain resistance to organic solvents, it is desirable to cross-link the acrylate resin. This can be done during polymerization by adding 0.5–5% (based on total monomer) and preferably 1.0–3.0% of a divinyl compound such divinylbenzene, allylacrylate, or diallylphthalate.

Water soluble catalysts such as sodium persulfate, ammonium persulfate, and hydrogen peroxide are used. A promoter such as sodium sulfite or sodium bisulfite can be used to speed up the polymerization. The mixture is agitated at a temperature of 40–120° C. and preferably a 50–75° C. for 3–12 hours.

The final product is a smooth viscous emulsion. In order to obtain films, fibers, and the like, that are resistant to immersion in water, it is necessary to add a hardening agent for the cellulose ester. In general, any of the known hardening agents may be used. Several examples include formaldehyde, trimethylolnitromethane, methylolureas, methylolmelamines, zirconium salts, polybasic acids, and the like. From 1–15% and preferably from 2–10% hardening agent is used based on the weight of cellulose esters present in the emulsion. Evaporation of the emulsion leaves a clear, flexible, tough film.

Fire retarding agents such as tricresylphosphate, triphenylphosphate, chloroethylphosphate, and the like, may be incorporated in the resin film.

Fibers may be spun by extrusion of a dispersion through a multihole spinneret into a coagulation bath of sodium sulfate or other salt. Alternatively, a dry spinning process can be used wherein the dope is extruded downward through a spinneret into a heated atmosphere that evaporates the water.

Acrylic acid esters used in this invention are derived from straight and branched alcohols containing from 1 to 6 carbon atoms. Suitable esters are those derived from the following alcohols: methyl, ethyl, propyl, n-butyl, isobutyl, sec.-butyl, n-amyl, isoamyl, and the like. A mixture of acrylic esters with other vinyl monomers such as methacrylates, vinyl acetate, vinyl chloride, acrylonitrile, methacrylonitrile, styrene, methacrylamide, and N-isopropylacrylamide may be used. The mixture should contain at least 50 mole percent acrylic esters.

The cellulose esters used in the practice of this invention may be prepared according to the procedures set forth in U.S. Patent 2,559,914 to Frank and U.S. Patent 2,622,079 to Crane.

The following examples are intended to illustrate the invention and not to limit its scope.

*Example 1*

Ten grams of water-soluble cellulose sulfate, sodium salt (5.2% S) was dissolved in 200 ml. of water and the following materials added.

|  | G. |
|---|---|
| Methyl acrylate | 30 |
| Divinyl benzene | 0.6 |
| Sodium dodecyl sulfate | 0.4 |
| Ammonium persulfate | 0.4 |
| Sodium bisulfite | 0.2 |

The mixture was stirred at 50–60° C. for 6 hrs. A viscous opaque emulsion was obtained. One gram of trimethylol melamine and 0.1 g. diammonium hydrogen phosphate were added to harden the cellulose sulfate.

The emulsion was coated onto cotton cloth and heated at 110° C. to evaporate the water. The cloth was flexible and unaffected by water, acetone, or naphtha. The cloth transmitted water vapor at the rate of 41 g./hr./square meter at 60% relative humidity.

Example 2

Using the procedure of Example 1, a coating emulsion was prepared from

| | | |
|---|---|---|
| Cellulose acetate-sulfate, sodium salt (8.6% S) | g | 10 |
| Water | ml | 200 |
| Methyl acrylate | g | 30 |
| Divinyl benzene | g | 0.6 |
| Sodium dodecyl sulfate | g | 0.4 |
| Ammonium persulfate | g | 0.4 |
| Sodium bisulfite | g | 0.2 |

Nylon cloth was coated with the emulsion. It transmitted water vapor at the rate of 35 g./hr./square meter at 77° C., at 40% relative humidity.

Example 3

Fifty grams of cellulose sulfate, sodium salt (6.1% S) was dissolved in 600 ml. of water and the following materials were added.

| | G. |
|---|---|
| Ethyl acrylate | 80.0 |
| Vinyl acetate | 40.0 |
| Allyl adipate | 1.0 |
| Potassium persulfate | 1.2 |
| Sodium bisulfite | 0.6 |
| Sodium octadecyl sulfate | 0.6 |

The mixture was stirred at 60–70° C. for 8 hrs. A viscous emulsion was formed. Ten milliliters of 40% formaldehyde solution and 0.5 g. ammonium chloride were added to the emulsion.

Tanned leather of the type used for hiking boot uppers was coated with the emulsion to give an increase in weight of 15% on a dry basis. After drying at 100° C. the coated leather was heated at 120° C. for 20 minutes. The treated leather showed a moisture vapor transmission of 60–70% of the untreated leather and would hold a hydrostatic head of 4 ft. of water without seepage.

Example 4

Fifty grams of cellulose acetate-sulfate, sodium salt (8.6% S) was dissolved in 500 ml. water and the following materials were added.

| | G. |
|---|---|
| Methyl acrylate | 50 |
| Methacrylamide | 50 |
| Allyl phthalate | 2.0 |
| Ammonium persulfate | 1.0 |

The mixture was stirred at 55–60° C. for 10 hrs. to give a very viscous emulsion. Five grams of dimethylol urea and 0.5 g. of diammonium hydrogen phosphate were added as hardening agents. The dope was extruded downward through a multihole spinneret into a hot-air cabinet maintained at 150–160° C. The filaments were collected on a spool at the bottom of the cabinet. The yarn was then heated at 120° C. for 30 min. The fibers were strong and elastic and had a strong affinity for direct cotton dyes, acid wool dyes, and cellulose acetate dyes.

Example 5

Using the method of Example 4 a smooth emulsion was prepared from the following materials.

| | G. |
|---|---|
| Ethyl acrylate | 40 |
| Cellulose salt, sodium sulphate | 20 |
| Sodium dodecyl sulfate | 1.0 |
| Acrylonitrile | 20 |
| Ammonium persulfate | 1.0 |

The composition was useful as a water-based wall paint. It dried in air to give smooth, tough coatings that could be washed with soap and water.

Various mixtures of polymeric materials with cellulose derivatives have been used as coating materials, but these mixtures are not polymerization products but rather mixtures of polymeric substances such as polymerized polyacrylates mixed with a cellulose derivative. These compositions can be used in sizes and as water soluble finishing agents. However, they are not cross-linked in order to get water insolubility and the resistance to water is not as great as that of the products produced according to this invention. Moreover, mixtures give cloudy weak films whereas the polymers made according to this invention give clear, strong films.

Acrylic esters have been polymerized in the past in the presence of cellulose esters wherein a small amount of the cellulose ester was used as an emulsifying agent or the like. However, the use of cellulose esters which are known to be used for this purpose in a larger quantity comparable with the proportions used in this invention have resulted in films which would be unsuitable for coating rainwear. For instance, the use of cellulose acetate in place of cellulose sulfate in Example 1, above, results in a vapor transmission rate of 15 grams per hour per square meter. Ethyl cellulose substituted for cellulose sulfate in Example 1 resulted in a vapor transmission rate of 4.5 grams per hour per square meter.

The special properties of the film obtained by this invention make them valuable for the following uses: Substitutes for leather and shoe uppers, raincoats and other types of wet apparel, tents, clothing that is resistant to toxic gases, and other purposes where the transmission of water vapor is desired. The products of the invention may also be converted into strong elastic fibers that show a high capacity for moisture and dye absorption. The products may also be used as water base paint and as a dipping lacquer. They are also valuable in coating paper to give a tough flexible backing.

The invention has been described in detail with particular reference to preferred embodiments thereof, but it will be understood that variations and modifications can be effected within the spirit and scope of the invention as described hereinabove and as defined in the appended claims.

We claim:

1. The polymeric composition comprising an alkyl acrylate in which the alkyl radical is of 1–6 carbon atoms polymerized in an aqueous solution of 0.5–5.0% by weight, based on the weight of the alkyl acrylate, of a cross linking agent selected from the group consisting of divinylbenzene, allyl acrylate and allyl phthalate, 20–75% by weight, based on the weight of the polymeric composition, of a water soluble salt of a sulfuric acid ester of cellulose, and 1–15% by weight, based on the weight of the cellulose ester, of a hardening agent selected from the group consisting of formaldehyde, trimethylolnitromethane, methylol-urea, and trimethylolmelamine.

2. The polymeric composition comprising an alkyl acrylate in which the alkyl radical is of 1–6 carbon atoms polymerized in an aqueous solution of 0.5–5.0% by weight, based on the weight of the alkyl acrylate, of a cross linking agent selected from the group consisting of divinylbenzene, allyl acrylate and allyl phthalate, 20–75% by weight, based on the weight of the polymeric composition, of cellulose sodium sulfate, and 1–15% by weight, based on the weight of the cellulose sulfate, of hardening agent selected from the group consisting of formaldehyde, trimethylolnitromethane, methylol-urea and trimethylolmelamine.

3. The polymeric composition comprising an alkyl acrylate in which the alkyl radical is of 1–6 carbon atoms polymerized in an aqueous solution of 0.5–5.0% by weight, based on the weight of the alkyl acrylate, of a cross linking agent selected from the group consisting of divinylbenzene, allyl acrylate and allyl phthalate, 20–75% by weight, based on the weight of the polymeric composition, of cellulose acetate sodium sulfate, and 1–

15% by weight, based on the weight of the cellulose acetate sodium sulfate, of hardening agent selected from the group consisting of formaldehyde, trimethylolnitromethane, methylol-urea and trimethylolmelamine.

4. A textile material coated with a polymeric composition comprising an alkyl acrylate in which the alkyl radical is of 1-6 carbon atoms polymerized in an aqueous solution of 0.5-5.0% by weight, based on the weight of the alkyl acrylate, of a cross linking agent selected from the group consisting of divinylbenzene, allyl acrylate and allyl phthalate, 20-75% by weight, based on the weight of the total polymeric composition, of a water soluble salt of a sulfuric acid ester of cellulose, and 1-15% by weight, based on the weight of the cellulose ester, of a hardening agent selected from the group consisting of formaldehyde, trimethylolnitromethane, methylol-urea, and trimethylolmelamine.

5. A textile material coated with a polymeric composition comprising an alkyl acrylate in which the alkyl radical is of 1-6 carbon atoms polymerized in an aqueous solution of 0.5-5.0% by weight, based on the weight of the alkyl acrylate, of a cross linking agent selected from the group consisting of divinylbenzene, allyl acrylate and allyl phthalate, 20-75% by weight, based on the weight of the total polymeric composition, of cellulose sodium sulfate and 1-15% by weight, based on the weight of the cellulose sodium sulfate, of a hardening agent selected from the group consisting of formaldehyde, trimethylolnitromethane, methylol-urea and trimethylolmelamine.

6. A textile material coated with a polymeric composition comprising an alkyl acrylate in which the alkyl radical is of 1-6 carbon atoms polymerized in an aqueous solution of 0.5-5.0% by weight, based on the weight of the alkyl acrylate, of a cross linking agent selected from the group consisting of divinylbenzene, allyl acrylate and allyl phthalate, 20-75% by weight, based on the weight of the total polymeric composition, of cellulose acetate sodium sulfate and 1-15% by weight, based on the weight of the cellulose acetate sodium sulfate, of a hardening agent selected from the group consisting of formaldehyde, trimethylolnitromethane, methylol-urea and trimethylolmelamine.

7. The process for forming a polymeric composition comprising polymerizing an alkyl acrylate in which the alkyl radical is of 1-6 carbon atoms in an aqueous solution containing 0.5-5.0% by weight, based on the weight of the alkyl acrylate, of a cross linking agent selected from the group consisting of divinylbenzene, allyl acrylate and allyl phthalate, 20-75% by weight, based on the weight of the total polymeric composition, of a water soluble salt of a sulfuric acid ester of cellulose and 1-15% by weight, based on the weight of the cellulose ester, of a hardening agent selected from the group consitsing of formaldehyde, trimethylolnitromethane, methylol-urea and trimethylolmelamine.

8. The process of forming a polymeric composition which comprises polymerizing an alkyl acrylate in which the alkyl radical is of 1-6 carbon atoms in an aqueous solution containing 0.5-5.0% by weight, based on the weight of the alkyl acrylate, of a cross linking agent selected from the group consisting of divinylbenzene, allyl acrylate and allyl phthalate, 20-75% by weight, based on the weight of the total polymeric composition, of cellulose sodium sulfate in solution in water and 1-15% by weight, based on the weight of the cellulose sodium sulfate, of a hardening agent selected from the group consisting of formaldehyde, trimethylolnitromethane, methylol-urea and trimethylolmelamine.

9. The process of forming a polymeric composition which comprises polymerizing alkyl acrylate in which the alkyl radical is of 1-6 carbon atoms in an aqueous solution containing 0.5-5.0% by weight, based on the weight of the alkyl acrylate, of a cross linking agent selected from the group consisting of divinylbenzene, allyl acrylate and allyl phthalate, 20-75% by weight, based on the weight of the total polymeric composition, of cellulose acetate sodium sulfate in solution in water and 1-15% by weight, based on the weight of the cellulose ester, of a hardener selected from the group consisting of formaldehyde, trimethylolnitromethane, methylol-urea and trimethylolmelamine.

References Cited by the Examiner
UNITED STATES PATENTS

| | | | |
|---|---|---|---|
| 2,559,914 | 7/51 | Frank | 260—215 |
| 2,839,479 | 6/58 | Caldwell et al. | 260—17 |

OTHER REFERENCES

Touey: "Modern Plastics," November 1951; pages 109, 110, 112, 114, and 183.

JOSEPH L. SCHOFER, *Primary Examiner.*

R. D. NEVIUS, JAMES E. SEIDLECK, LEON J. BERCOVITZ, *Examiners.*